United States Patent
Guillaume et al.

(10) Patent No.: US 11,281,356 B2
(45) Date of Patent: Mar. 22, 2022

(54) METHOD AND ELECTRONIC DEVICE FOR SELECTING FILES IN A FILE SYSTEM

(71) Applicants: Mathieu Guillaume, Oberlunkhofen (CH); Nicolas Cardiles, Rotkreuz (CH)

(72) Inventors: Mathieu Guillaume, Oberlunkhofen (CH); Nicolas Cardiles, Rotkreuz (CH)

(73) Assignee: BeesWall GmbH, Rotkreuz (CH)

( * ) Notice: Subject to any disclaimer, the term of this patent is extended or adjusted under 35 U.S.C. 154(b) by 0 days.

(21) Appl. No.: 17/045,362

(22) PCT Filed: Apr. 17, 2019

(86) PCT No.: PCT/CH2019/050008
§ 371 (c)(1),
(2) Date: Oct. 5, 2020

(87) PCT Pub. No.: WO2019/213786
PCT Pub. Date: Nov. 14, 2019

(65) Prior Publication Data
US 2021/0165538 A1    Jun. 3, 2021

(30) Foreign Application Priority Data

May 9, 2018    (CH) .................................... 00582/18

(51) Int. Cl.
| | | |
|---|---|---|
| *G06F 3/048* | (2013.01) | |
| *G06F 3/0482* | (2013.01) | |
| *G06F 16/16* | (2019.01) | |
| *G06F 16/185* | (2019.01) | |

(52) U.S. Cl.
CPC .......... *G06F 3/0482* (2013.01); *G06F 16/168* (2019.01); *G06F 16/185* (2019.01); *G06F 2203/04803* (2013.01); *G06F 2203/04806* (2013.01)

(58) Field of Classification Search
None
See application file for complete search history.

(56) References Cited

U.S. PATENT DOCUMENTS

2008/0141176 A1 *    6/2008   Fukuoka ............... G06F 3/0482
715/853

OTHER PUBLICATIONS

Windows 10 (Edition: Window 10 Enterprise N 2016) (Year: 2016).*
International Search Report for PCT/CH2019/050008 dated Aug. 14, 2019 (p. 2).

(Continued)

*Primary Examiner* — Thanh T Vu
(74) *Attorney, Agent, or Firm* — Quantum Patent Law Firm (57) ABSTRACT

A method for electronic device which is in communication with a graphical user interface and one or more file systems is disclosed. The method includes: displaying, on the graphical user interface, a visual representation for each one of a plurality of folders of the one or more file systems while suppressing displaying of a visual representation of files stored in the folders; receiving, via the graphical user interface, a user command defining the selection of a first folder; displaying, on the graphical user interface, a visual representation for each one of one or more files stored in the first folder while suppressing displaying of a visual representation of folders stored in the first folder; and receiving, via the graphical user interface, a user command defining the selection of a first file.

20 Claims, 6 Drawing Sheets

(56) References Cited

OTHER PUBLICATIONS

Anonymous, Chapter 2 File Manager (OpenWindows User's Guide), Apr. 2, 2016 (Apr. 2, 2016), XP055495652, Retrieved from the Internet: URL: https://web.archive.org/web/20171009132253/https://www.jam-software.com/treesizefree/index.shtml [retrieved on Jul. 26, 2018].

* cited by examiner

| Name | Type | Date | Analytics |
|---|---|---|---|
| minutes | .doc | 23 02 17 | # 12 |
| summary | .doc | 08 09 16 | # 32 |
| addresses | .doc | 02 12 17 | # 17 |

METHOD AND ELECTRONIC DEVICE FOR SELECTING FILES IN A FILE SYSTEM

CROSS-REFERENCE TO RELATED APPLICATIONS

This application is a U.S. national stage application, filed under 35 U.S.C. § 371, of International Patent Application No. PCT/CH2019/050008, filed on Apr. 17, 2019, which claims priority to Swiss patent application CH 00582/18, filed on May 9, 2018, the entire contents of which are incorporated by reference herein in its entirety.

FIELD OF THE INVENTION

The present invention relates to a method and an electronic device for selecting files in one or more file systems.

BACKGROUND ART

Graphical user interfaces are widely deployed. A graphical user interface is a user interface that allows users to interact with electronic devices such as personal computers, notebook computers, tablet computers, smartphones, etc. A graphical user interface includes various technologies and devices. In particular, a graphical user interface includes a display device for displaying graphical objects such as a desktop, windows, icons, graphical objects, text objects, representations of folders of a file system, representations of files of a file system, etc. A display device may include a desktop monitor, a laptop computer monitor, a smartphone display, a tablet display, a beamer, a television monitor, etc. Moreover, a graphical user interface includes an input device such as a mouse, a touchpad, a touchscreen, etc. for enabling a user to interact with graphical objects displayed on the display device. In some embodiments such in case of a smartphone or a tablet computer, the user interacts with a touchscreen of the smartphone or tablet computer, which touchscreen functions both as a display device and as an input device. Interaction of a user with the graphical objects includes manipulating a pointer displayed on the display device for selecting, activating, moving, etc. one or more graphical objects. Graphical user interfaces are widely used for enabling users to interact with personal or notebook computers operated by an operating system such as Microsoft Windows® or Mac OS® or Linux, or for enabling users to interact with tablet computers or smartphones operated by an operating system such as Android® or iOS®.

Such operating systems include file systems which provide functionalities for organizing data stored in storage devices such as hard disks, cloud drives, etc. A file system includes folders and files. Sometimes folders are denominated as directories. Files enable storing of data such as documents, presentation slides, spreadsheets, pictures, videos, etc. Files may also enable storing of executable program instructions for enabling particular functionalities, such as operating system functionalities, word processing applications, slide processing applications, spreadsheet processing applications, etc. Folders are arranged in a hierarchical structure, wherein folders may contain both subfolders and files, or only subfolders, or only files. Folders enable the grouping of files into separate collections.

In order to access folders and files in accordance to the prior art, file manager applications such as File Explorer (Windows®) or Finder (MacOS®) are widely used. Accessing files may enable to create or delete files and/or to modify the content of files. Accessing folders and files may enable to create or delete folders and files and/or to modify the structure of the folders and files. Accessing folders and files may also enable to add or delete applications and/or to execute applications.

Figure 1:
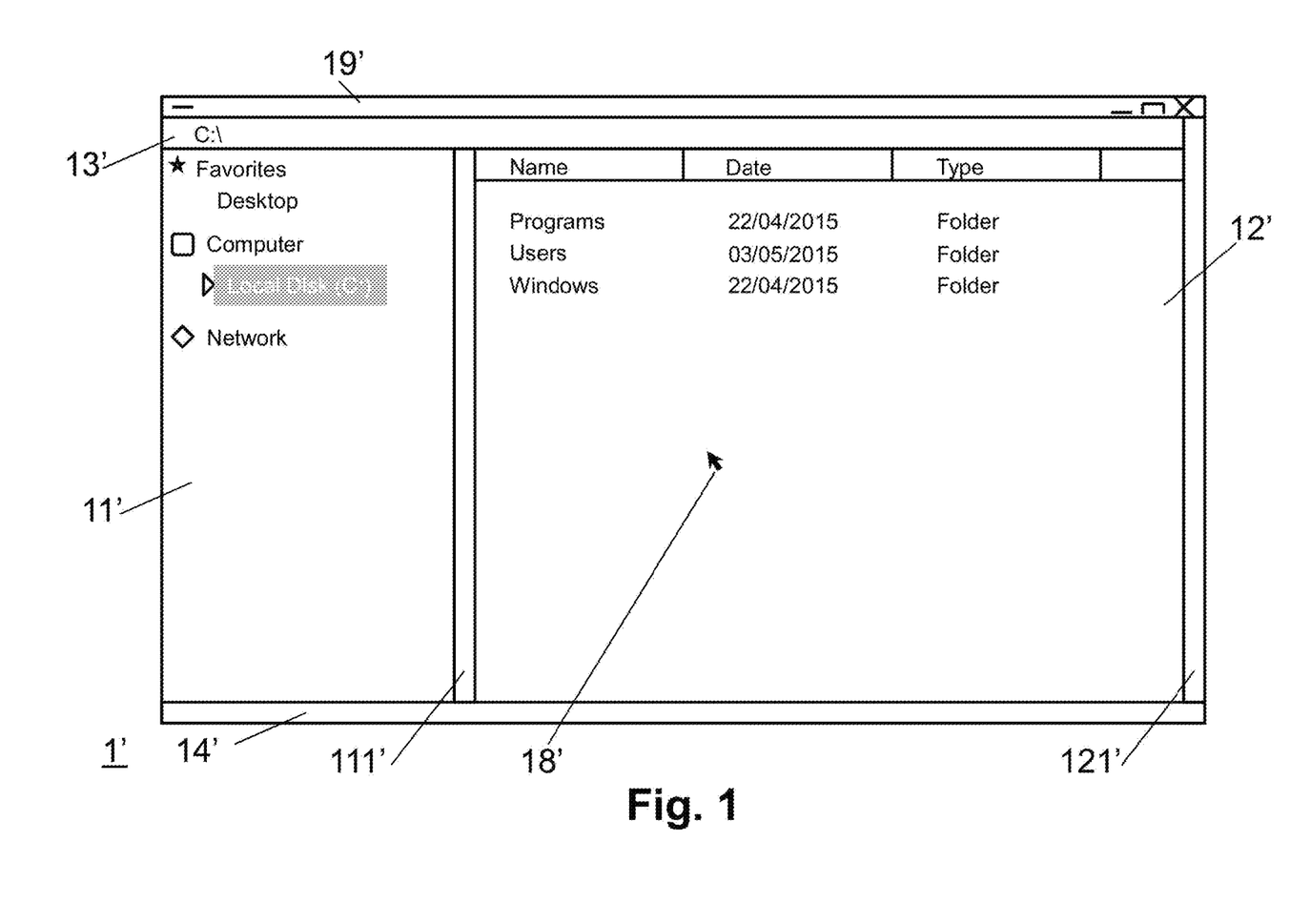
FIG. 1 illustrates schematically an initial stage of File Explorer of the Windows® operating system.
Figure 2:
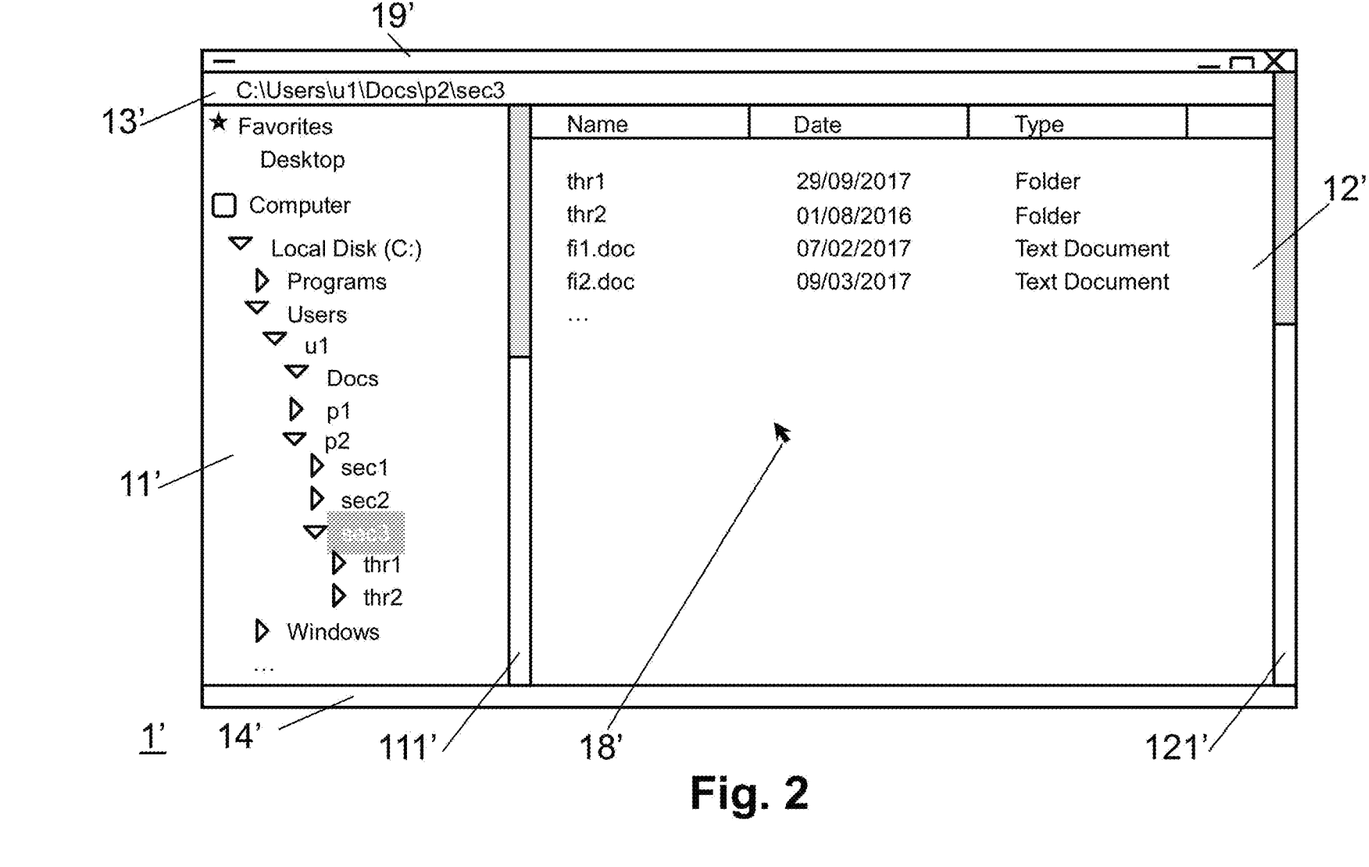
FIG. 2 illustrates schematically a stage of File Explorer of the Windows® operating system when the user has navigated to a particular folder.

FIG. 1 and FIG. 2 illustrate schematically the file manager application File Explorer 1' of the operating system Windows®.

FIG. 1 illustrates schematically an initial stage of File Explorer 1', which includes a navigation area if, a display area 12', a current folder area 13', and an information area 14'. The File Explorer f may be displayed on a display device such as a monitor of a desktop computer or laptop computer. As usual for windows managed by the operating system Windows®, the File Explorer 1' includes a task bar 19', which enables minimizing, maximizing, closing, etc. the File Explorer 1'. Moreover, in the illustrative example of FIG. 1 and FIG. 2, a mouse pointer 18' is located within the File Explorer f. The mouse pointer 18' may be manipulated by an input device such as a computer mouse of a desktop computer or a touchpad of a laptop computer. The navigation area if includes a scroll bar 111' and the display area 12' includes a scroll bar 121'. The scroll bars enable scrolling in case the information displayed in the navigation area 11' respectively in the display area 12' exceeds the available area in the navigation area if respectively in the display area 12'. At the stage illustrated in FIG. 1, the user has selected in the navigation area 11' the folder Local Disk (C:), wherein the folder Local Disk (C:) is displayed in the navigation area if in a reverse manner. Correspondingly, in the display area 12', the folders and files contained in the folder Local Disk (C:) are displayed, for example a program folder Programs, a user data folder Users, an operating system folder Windows, etc. Correspondingly, in the current folder area 13', the current folder C:\ is displayed. As illustrated in FIG. 1, the navigation area if includes a Favorites section for selecting favourite locations such as the desktop folder of the user. As illustrated in FIG. 1, the navigation area 11' includes a Network section for selecting network locations such as a shared folder of a network server.

FIG. 2 illustrates a stage of File Explorer f after the user has navigated to and selected a particular folder C:\Users\u1\Docs\p2\sec3 in the file system stored on the Local Disk (C:). The folder selected by the user is displayed in the navigation area 11' in reverse manner, together with the folder hierarchy for arriving to this particular folder. The folder hierarchy for arriving to this particular folder is marked with triangles facing to the bottom if the folder has been accessed during navigation, and facing to the right if the folder has not been accessed during navigation. The folder the user has selected is also displayed in the current folder area 13', namely C:\Users\u1\Docs\p2\sec3. In order to arrive to this folder, the user sequentially accesses, for example by pointing the mouse on the folder and double clicking, in the navigation area 11' the folders Local Disk (C:), then the folder Users, then the folder u1, then the folder Docs, then the folder p2, and then the folder sec3. Accordingly, in the display area 12' the folders and files of the folder sec3 are displayed, which includes the folders thr1, thr2, and the files fit, fie. In order to arrive to the folder C:\Users\u1\Docs\p2\sec3, the user has to point and double click on at least six folders. Moreover, in particular if the folder C:\Users\u1\Docs\p2\sec3 contains a lot of subfolders (not only two as illustrated in FIG. 2), the user may have to additionally manipulate the scroll bar 121' of the display area 12' in order to access a desired file. Typically, folders of a file system contain more folders and files as illustrated in the example according to FIG. 2, and access to particular folders and files usually requires a large number of manipulations of the input device of the graphical user interface.

Finder (MacOS®) includes a column view option, wherein for example six or eight columns are displayed, and wherein each column contains folders and files of a particular hierarchy level of the file system, if applicable together with a scroll bar.

DISCLOSURE OF THE INVENTION

It is an object of the present invention to provide a method and an electronic device, which do not have at least some of the disadvantages of the prior art. In particular, it is an object of the present invention to provide a method and an electronic device, which enable finding and accessing folders and/or files of one or more file systems. In particular, it is an object of the present invention to provide a method and an electronic device, which enable finding and accessing folders and/or files of one or more file systems more efficiently. In particular, it is an object of the present invention to provide a method and an electronic device, which enable finding and accessing folders and/or files of one or more file systems with reduced manipulations of input devices such as pointing devices. In particular, it is an object of the present invention to provide a method and an electronic device, which enable finding and accessing folders and/or files of one or more file systems within two clicks or less.

According to the present invention, these objects are achieved through the features of the independent claims. In addition, further advantageous embodiments follow from the dependent claims and the description.

According to the present invention, the above-mentioned objects are particularly achieved in that a method comprises at an electronic device which is in communication with a graphical user interface and one or more file systems: displaying, on the graphical user interface, a visual representation for each one of a plurality of folders of the one or more file systems while suppressing displaying of a visual representation of files stored in the folders; receiving, via the graphical user interface, a user command defining the selection of a first folder; displaying, on the graphical user interface, a visual representation for each one of one or more files stored in the first folder while suppressing displaying of a visual representation of folders stored in the first folder; and receiving, via the graphical user interface, a user command defining the selection of a first file.

Thus, in a first step, the available folders are presented to the user, from which folders the user can select a first folder, for example by a click on the first folder. Then, in a second step, the available files in the first folder are presented to the user, from which the user can select a first file. Because the folders are presented to the user without the files stored in the folders, a compact representation of the folders is displayed and less user manipulations are required in order to be able to select the first folder. Contrary to the prior art, where the user has to click through the folder hierarchy in order to arrive to the desired folder. Because the files are presented to the user without further folders, a compact representation of the files is displayed and less user manipulations are required in order to be able to select the first file. Contrary to the prior art, where the user has to scroll through the list of folders and files stored in the desired folder in order to be able to select the desired file. Accordingly, finding and accessing folders and/or files is more efficient. In particular, usage and/or manipulation of input devices such as pointing devices is reduced. In particular, finding and accessing folders and/or files within two clicks or less is enabled.

Instead or additionally to presenting the available files in the first folder to the user in the second step, for example depending on if the click on the first folder is a left click or a right click, additional information about the first folder may be displayed, such as comments, classifications, analytics, etc. as described below.

When the user selects the first file, one or more functions may be performed. For example, when the user selects the first file with a left click, a corresponding application for editing the file may be started. For example, when the user selects the first file with a right click, instead or additionally to starting the application, additional information about the first file may be displayed, such as comments, classifications, analytics, etc. as described below.

Comments may relate to textual or graphical information about a folder or file.

Classifications may relate to the name, type, owner, access time, creation time, modification time, etc. of a folder or file. Classifications may relate to particular user names for which a folder or file is currently shared. Displaying the folders or files may include displaying one or more user interface elements for arranging folders of files in accordance to a classification, such as sorting of folders or files in accordance to the name, type, owner, access time, etc.

Analytics may relate to usage of folders or files by particular users such as number of accesses, access time, modification time, etc. Displaying the folders or files may include displaying one or more user interface elements for arranging folders of files in accordance to analytics, such as sorting of folders or files in accordance to the number of uses by a particular user, access time by a particular user, etc.

The visual representation of folders or files may include text, graphical objects, pictures, images, animations, colours, etc.

The one or more file systems may include a Windows® file system, such as NTFS, fat32, etc., a MacOS® file system, such as APFS, HFS+, etc., a Linux file system, such as ext3, ext4, etc., a Cloud file system, such as Google Drive, OneDrive, etc., a smartphone file system of a smartphone running Android® or iOS®, or any other file system. The one or more files systems include files for storing data and/or executable instructions. The one or more file systems may include folders for storing files. The files may have stored data such as document data, slide data, spreadsheet data, etc. The files may have stored executable instructions of applications or libraries.

Displaying, on the graphical user interface, a visual representation for each one of a plurality of folders of the one or more file systems may include displaying the full architecture of the folders of the one or more file systems. Displaying, on the graphical user interface, a visual representation for each one of one or more files stored in the first folder may include displaying the full list of files stored in the first folder.

Displaying, on the graphical user interface, a visual representation for each one of a plurality of folders of the one or more file systems may include displaying a personalized view in accordance to stored preferences. Displaying, on the graphical user interface, a visual representation for each one of one or more files stored in the first folder may include displaying a personalized view in accordance to stored preferences.

Displaying a visual representation for a folder may include displaying one or more properties of the folder such as comments associated with the folder. Displaying a visual representation of a file may include displaying one or more properties of the file such as comments associated with the file. Properties of the folder and/or the file may include type, associated application, size, creation date, modification date, access date, attributes such as read-only, hidden, etc., security properties, custom properties, summary, etc.

The electronic device may be in communication with a graphical user interface, which is included in the electronic device. Alternatively or additionally, the electronic device may be in communication with a graphical user interface, which is remote from the electronic device. In an embodiment, sharing views of folders and/or files is enabled, such that views of folders and/or files may be displayed on a graphical user interface which is local to the electronic device, and alternatively or additionally on a graphical user interface which is remote from the electronic device.

The electronic device may include one or more processors in communication with a memory having stored instructions executable by the one or more processors such that the electronic device performs required functions. The memory may be included in the electronic device or may be located remote from the electronic device. Communication between the one or more processors and the memory having stored the instructions may be based on a bus system of a computer, on a network system of a computer network, etc. The electronic device may include a desktop computer, a portable computer, a mobile phone, a smartphone, or a similar electronic device. The electronic device may run an operating system such as Windows®, MacOS®, Linux, Android®, iOS®, or any other operating system.

In an embodiment, the method further comprises arranging the visual representations of the plurality of folders in accordance to a substantially hierarchical level of the folders. For example, the file system may include a root folder having stored several first level folders, each first level folder having stored several second level folders, etc. For example, the visual representation of the root folder, the first level folders, the second level folders, etc. are displayed from left to right. Arranging the visual representations of the plurality of folders in accordance to a hierarchical level provides for a compact representation of the folders.

In an embodiment, the method further comprises arranging the visual representations of subfolders of a parent folder along a borderline of the visual representation of the parent folder. For example, the file system may include a root folder having stored several first level folders, each first level folder having stored several second level folders, etc. For example, the visual representation of the first level folders are arranged along a borderline of the visual representation of the root folder, the visual representations of the second level folders are arranged along a borderline of the corresponding visual representations of the first level folders, etc. Arranging the visual representations of the plurality of folders along a borderline provides for a compact representation of the folders.

In an embodiment, the method further comprises adapting the visual representation of a parent folder to the number of subfolders stored in the parent folder. For example, the file system may include a root folder having stored several first level folders, each first level folder having stored several second level folders, etc. For example, the size of the visual representation of the root folder may correspond to the number of first level folders, the size of each of the visual representations of the first level folders may correspond to the number of second level folders stored in the respective first level folder, etc. Adapting the visual representations of the folders to the number of subfolders stored therein provides for a compact representation of folders.

In an embodiment, the method further comprises displaying one or more visual representations of the plurality of folders substantially in the form of rectangles. Displaying the visual representations of the folders in the form of rectangles provides for a compact representation of the folders.

In an embodiment, the method further comprises selecting the plurality of folders in accordance to one or more predefined rules. The one or more predefined rules may include user preferences, such as a particular set of folders the user is currently working with of the one or more file systems. The one or more predefined rules may include master preferences, such as a particular set of folders a project leader has given access to the user. The one or more predefined rules may include name patterns for selecting particular folders of the one or more file system. Selecting the plurality of folders in accordance to one or more predefined rules provides for a compact representation of the folders.

In an embodiment, the method further comprises receiving, via the graphical user interface, a user command defining an operation for the first file. The command may correspond to a double click for opening the file. The command may relate to a right click for displaying properties of the file. Receiving a user command defining an operation for the first file enables efficient access to files.

In an embodiment, the method further comprises receiving, via the graphical user interface, a user command defining one or more of a zoom level and a focus area, and adapting displaying of the visual representations of the plurality of folders to one or more of the zoom level and the focus area. Receiving and adapting the zoom level and focus area enables efficient navigation in files systems having stored a large number of folders.

In an embodiment, the method further comprises displaying, on the graphical user interface, a recent file area for displaying a list of recently selected files. Maintaining a list of recently selected files provides for increased efficiency in accessing files.

In an embodiment, the method further comprises displaying, on the graphical user interface, a drop file area for enabling dropping and processing of a file selected from a further application. Processing the file may include creating a new file and storing the new file in a particular folder of the one or more file systems. For example, the user may be prompted to define the particular folder after having dropped the file.

Beside a method, the present invention relates to an electronic device which is enabled for communication with a graphical user interface and one or more file systems, wherein the electronic device is further configured for displaying, on the graphical user interface, a visual representation for each one of a plurality of folders of the one or more file systems while suppressing displaying of a visual representation of files stored in the folders; receiving, via the graphical user interface, a user command defining the selection of a first folder; displaying, on the graphical user interface, a visual representation for each one of one or more files stored in the first folder while suppressing displaying of a visual representation of folders stored in the first folder; and receiving, via the graphical user interface, a user command defining the selection of a first file.

In an embodiment, the electronic device is further configured for: arranging the visual representations of the plurality of folders in accordance to a hierarchical level of the folders.

In an embodiment, the electronic device is further configured for: arranging the visual representations of subfolders of a parent folder along a borderline of the visual representation of the parent folder.

In an embodiment, the electronic device is further configured for: adapting the visual representation of a parent folder to the number of subfolders stored in the parent folder.

In an embodiment, the electronic device is further configured for: displaying one or more visual representations of the plurality of folders substantially in the form of rectangles.

In an embodiment, the electronic device is further configured for: selecting the plurality of folders in accordance to one or more predefined rules.

In an embodiment, the electronic device is further configured for: receiving, via the graphical user interface (1), a user command defining an operation for the first file.

In an embodiment, the electronic device is further configured for: receiving, via the graphical user interface (1), a user command defining one or more of a zoom level and a focus area, and adapting displaying of the visual representations (11) of the plurality of folders to one or more of the zoom level and the focus area.

In an embodiment, the electronic device is further configured for: displaying, on the graphical user interface (1), a recent file area (15) for displaying a list of recently selected files.

In an embodiment, the electronic device is further configured for: displaying, on the graphical user interface (1), a drop file area (16) for enabling dropping and processing of a file selected from a further application.

BRIEF DESCRIPTION OF THE DRAWINGS

The herein described invention will be more fully understood from the detailed description given herein below and the accompanying drawings which should not be considered limiting to the invention described in the appended claims. The drawings are showing:

MODE(S) FOR CARRYING OUT THE INVENTION

FIG. 1 and FIG. 2, as described above, illustrate schematically the file manager application File Explorer of the operating system Windows®.

Figure 3:
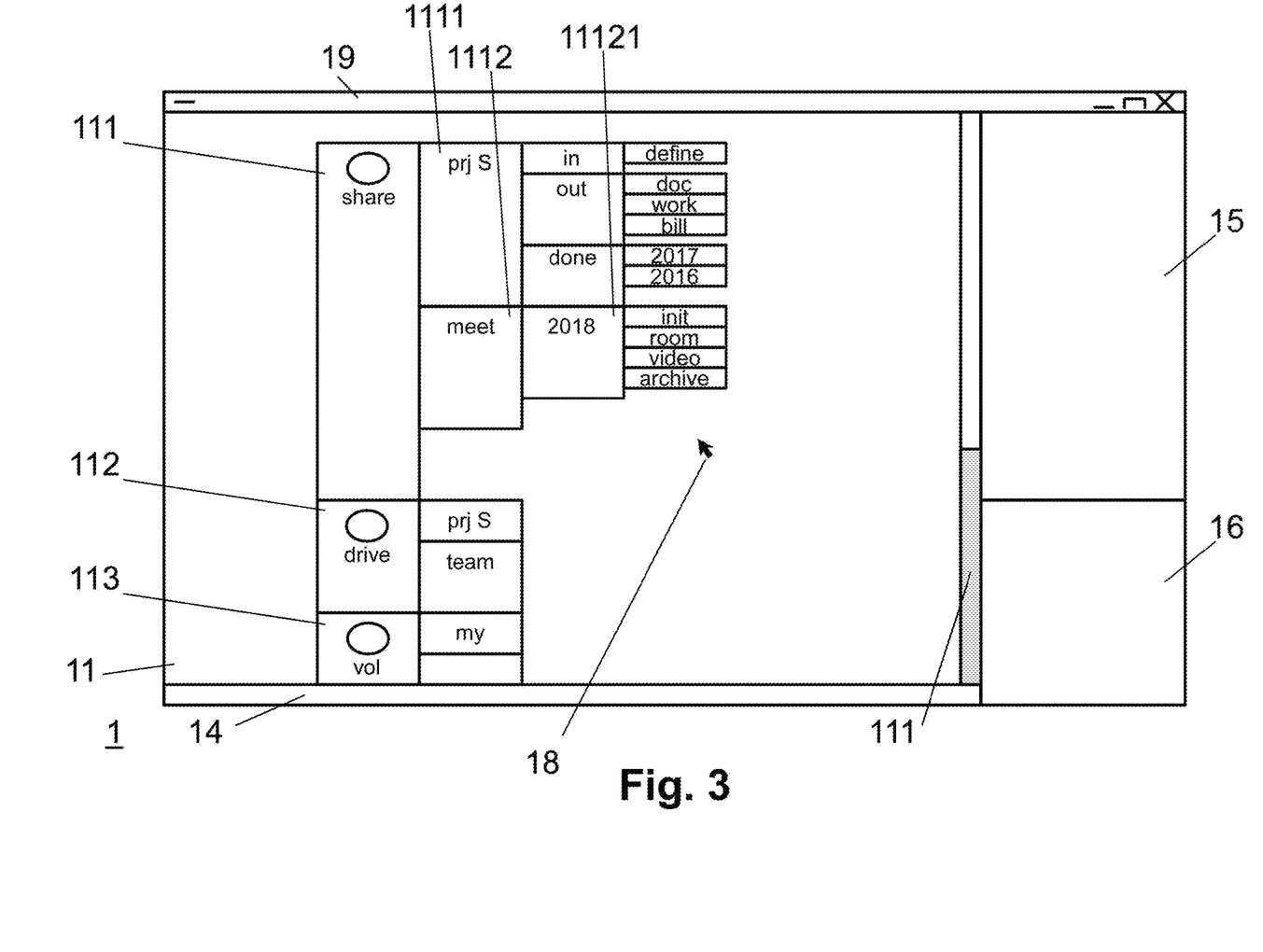
FIG. 3 illustrates schematically displaying, on a graphical user interface, a visual representation for each one of a plurality of folders.

FIG. 3 illustrates schematically a graphical user interface 1 with a folder area 11, a recent file area 15, a drop file area 16, a task bar 19, and an information area 14. Each of the folder area 11 and the recent file area 15 may have associated a scroll bar. In FIG. 3, only the folder area 11 has a scroll bar 111.

FIG. 3 illustrates schematically displaying, in the folder area 11 of the graphical user interface 1, a visual representation 111, 112, . . . , 1111, 1112, . . . , . . . , 11121, . . . for each one of a plurality of folders of three file systems. As illustrated in FIG. 3, the visual representation 111, 112, . . . , 1111, 1112, . . . , 11121, . . . are displayed in a folder area 11.

A file system is a hierarchical structure and includes a root folder. Below the root folder, zero or more first level folders are included. Below each of the zero or more first level folders, if applicable, zero or more second level folders are included. Below each of the zero or more second level folders, if applicable, zero or more third level folders are included. Etc.

The present description applies to any number of file systems, each having any number of folders.

FIG. 3 illustrates visual representations having a rectangular shape, wherein the visual representations of root folders are arranged on the left and visual representations of the higher level folders follow on the right. The size of the rectangles may depend on the number of higher level folders included in a particular folder and the level of this folder in the file system.

The rectangles may connect to each other. As illustrated in FIG. 3, the visual representations may include a folder name.

The visual representation with reference numeral 111 may relate to the root folder of a file system of a network share such as a SharePoint® of Microsoft®. The visual representation with reference numeral 112 may relate to the root folder of a file system of a Google Drive® of Google®. The visual representation with reference numeral 112 may relate to the root folder of a file system of a local disk, for example to a NTFS file system of a local disk. Thus, FIG. 3 illustrates displaying of three different file systems in the folder area 11.

As illustrated in FIG. 3, the file system with the root folder with reference numeral 111 includes two first level folder, of which the first level folder includes three second level folders, and the second first level folder includes one second level folders, wherein the file system includes ten third level folders and zero higher level folders.

As illustrated in FIG. 3, the file system with the root folder with reference numeral 112 includes two first level folders, and zero second level folders.

As illustrated in FIG. 3, the visual representations are only partially shown of the folders of the file system with reference numeral 113. As illustrated in FIG. 3, this file system includes at least two first level folders. In order to make visible the remaining of the file system with reference numeral 113, the user may manipulate the scroll bar in of the folder area 11.

The visual representations with reference numerals 111, 112, 113 refer to the root folder of the respective file system.

The visual representations with reference numerals 1111, 1112 refer to the first level folder below the root folder of the respective file system. Respective reference numerals 1121, . . . as regards the file system with the visual representation with reference numeral 112 of the root folder, and respective reference numerals 1131, . . . as regards the file system with the visual representation with reference numeral 112 of the root folder are not included in FIG. 3 for reasons of not unnecessarily complicating the drawing.

The visual representation with reference numeral 11121 refers to the second level folder below the first level folder with reference numeral 1112. Respective reference numerals 11111, . . . as regards the second level folders below the first level folder with reference numeral 1111 are not included in FIG. 3 for reasons of not unnecessarily complicating the drawing.

Respective reference numerals 111111, . . . as regards the third level folders below the second level folders with reference numerals 11111, . . . are not included in FIG. 3 for reasons of not unnecessarily complicating the drawing.

Thus, as illustrated in FIG. 3, the visual representations 11 of the plurality of folders are arranged in accordance to a hierarchical level of the folders. The visual representations 11 of the folders are rectangles, wherein the visual representation 11 of a lower level folder, or in other words of a subfolder, are arranged along a borderline of its higher level folder, or in other words of its parent folder. In particular, the visual representation 11 of a subfolder is arranged along the right borderline of the parent folder. The visual representation 11 of folder is adapted to the number of lower level folders stored in the folder, or in other words, the visual representation 11 of a parent folder is adapted to the number of subfolders stored in the parent folder. For example, as illustrated in FIG. 3 the visual representation 11 of the folder named "in" is smaller than the visual representation 11 of the folder named "out", because the folder "in" includes only one folder named "define", but the folder named "out" includes three folders named "doc", "work", and "bill".

As illustrated in FIG. 3, displaying of visual representations of files stored in the folders is suppressed, such that the visual representation 11 includes only folders and no files.

In the example illustrated in FIG. 3, the recent files area 15 is empty. Recent files may be added to the recent files area 15 after each selection of a file. A scroll bar may be included in case the number of files exceeds the area of the recent file area 15.

Figure 4:
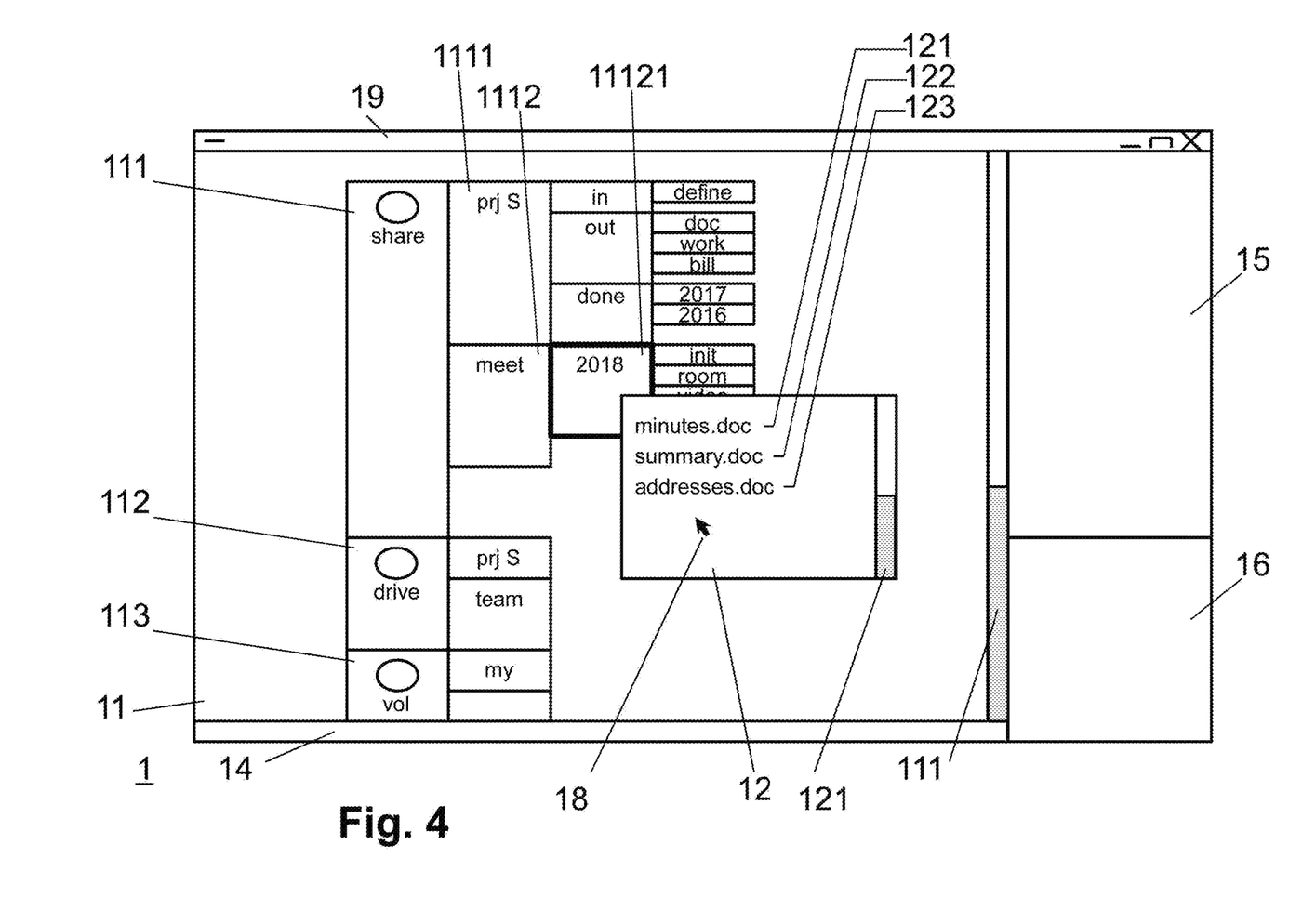
FIG. 4 illustrates schematically displaying, on the graphical user interface, a visual representation for each one of one or more files stored in a first folder.

FIG. 4 illustrates schematically the graphical user interface 1 of FIG. 3 after the user has selected the visual representation 11121 of a first folder and after a visual representation 12 for each file stored in the first folders has been displayed. As illustrated in FIG. 3, the visual representation 12 includes the files named "minutes.doc" (having reference numeral 121), "summary.doc" (having reference numeral 122), and "addresses.doc" (having reference numeral 123), wherein the visual representation of the folders included in the first folder is suppressed. Namely, the visual representation of the folders named "init", "room", "video", and "archive" is suppressed (cf. FIG. 3 for the names of the folders included in the first folder).

Figure 5:
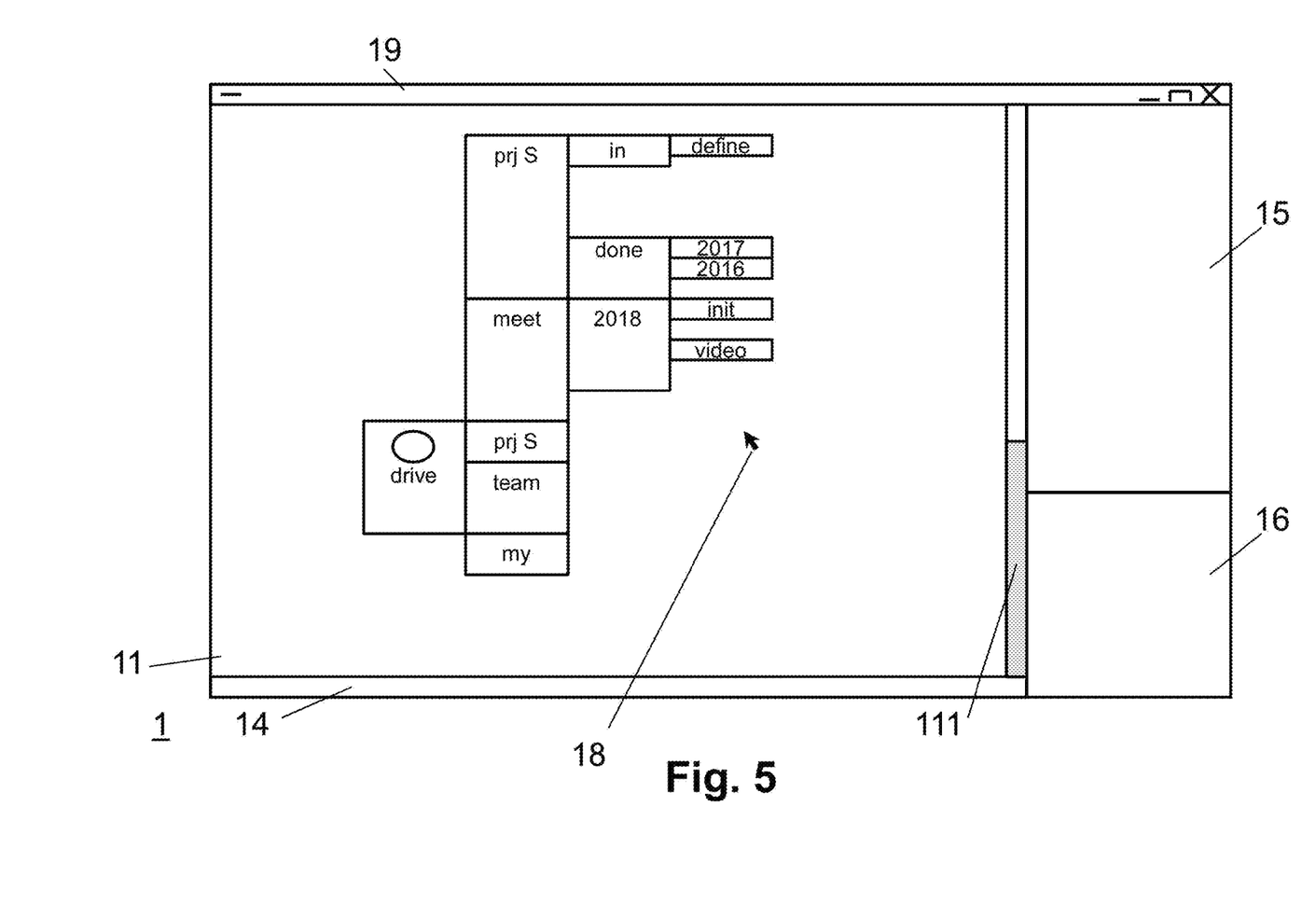
FIG. 5 illustrates schematically displaying, on a graphical user interface, a visual representation for each one of a plurality of folders selected in accordance to one or more predefined rules.

FIG. 5 illustrates schematically the visual representation 11 of a plurality of folders, wherein the plurality of folders are selected in accordance to one or more predefined rules. For example, as illustrated in FIG. 5, the plurality of folders includes the root folder named "drive", but does not include the other root folders named "share" and "vol" illustrated in FIG. 3. For example, as illustrated in FIG. 5, the plurality of folders includes the first level folders named "prj S" and "meet of file system named "share", the first level folders named "prj S" and "team" of file system named "drive", and the first level folder named "my" of file system named "vol". For example, as illustrated in FIG. 5, the plurality of folders includes a subset of second level folders and third level folders of the folder illustrated in FIG. 3. The one or more predefined rules may relate to definitions of particular folders which a particular user may access, modify, etc. The one or more predefined rules may be stored in a user profile, or may be administered by a system or team administrator. The one or more predefined rules may relate to analytics as regards the number of times the user accessed a particular folder, such that only folders are presented to the user having a certain level of likelihood to be used.

Figure 6:
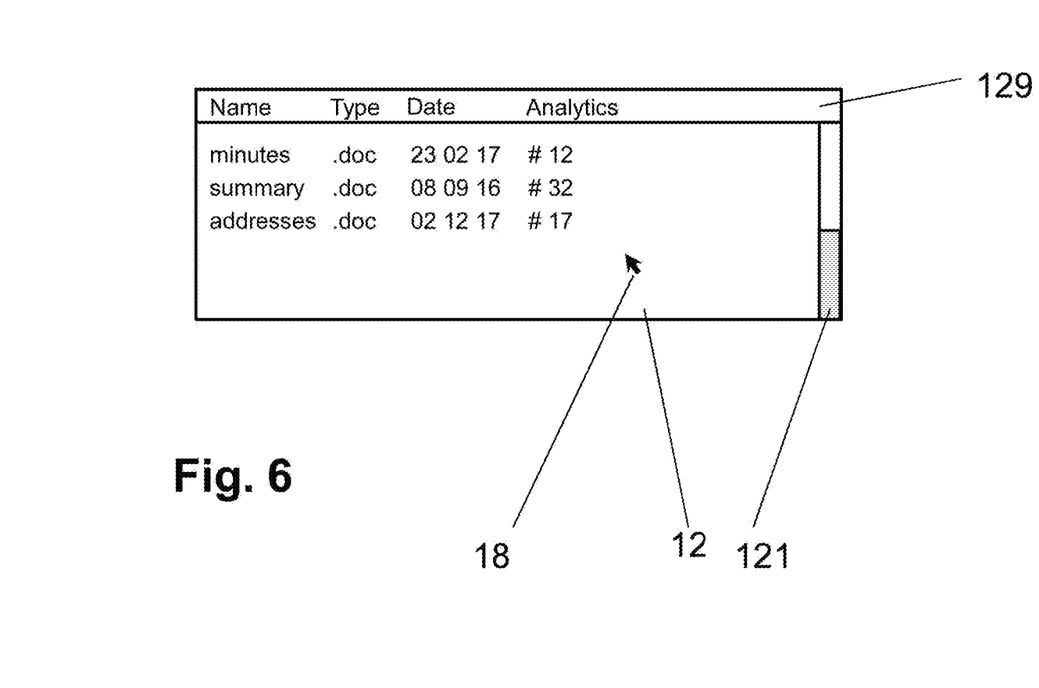
FIG. 6 illustrates schematically a detailed view of a visual representation for each one of one or more files stored in a first folder.

FIG. 6 illustrates schematically a detailed view of another embodiment of the visual representation 12 of the files included in the first folder. For reasons of not unnecessarily complicating the drawing, FIG. 6 does not include the remaining elements of the graphical user interface 1. The visual representation 12 of the files according to FIG. 6 includes a header 129 having elements named "Name", "Type", "Date", and "Analytics". Accordingly, the visual representation of the files can be sorted in accordance to their name, type, date, and analytics. Further or other elements may be included in the header 129, such as modification time, access time, owner, group access, shared to names, number of modifications, etc. The analytics may relate to the number of accesses to a file, the number of modifications, the number of users having access to the file, etc.

The same principle as illustrated in FIG. 6 can be applied to the visual representation 11 of the folders and/or to the recent files area 15.

The invention claimed is:

1. A method for an electronic device which is in communication with a user through a graphical user interface, the method comprising:
displaying, on the graphical user interface, a content of a file system using a visual representation for each one of a plurality of folders in the file system while suppressing a visual representation of each one of one or more files stored in each one of the plurality of folders in the file system;
receiving, via the graphical user interface, a user command defining selection of a first folder among the plurality of folders;
displaying, upon receipt of the user command defining the selection of the first folder, on the graphical user interface, a content of the first folder using the visual representation for each one of one or more files stored in the first folder while suppressing the visual representation of each one of the folders stored in the first folder; and
receiving, via the graphical user interface, a user command defining the selection of a first file among the one or more files.

2. The method according to claim 1, further comprising: arranging the visual representation of the plurality of folders in accordance with a hierarchical level of the plurality of folders.

3. The method according to claim 1, further comprising: arranging a visual representation of subfolders of a parent folder along a borderline of a visual representation of the parent folder.

4. The method according to claim 1, further comprising: adapting a visual representation of a parent folder to a number of subfolders stored in the parent folder.

5. The method according to claim 1, further comprising: displaying the visual representation of the plurality of folders in substantially rectangular shapes.

6. The method according to claim 1, further comprising: selecting the plurality of folders in accordance with one or more predefined rules.

7. The method according to claim 1, further comprising: receiving, via the graphical user interface, a user command defining an operation for the first file.

8. The method according to claim 1, further comprising: receiving, via the graphical user interface, a user command defining one or more of a zoom level and a focus area, and adapting the displaying of the visual representation of the plurality of folders to one or more of the zoom level and the focus area.

9. The method according to claim 1, further comprising: displaying, on the graphical user interface, a recent file area for displaying a list of recently selected files.

10. The method according to claim 1, further comprising: displaying, on the graphical user interface, a drop file area for enabling dropping and processing of a file selected from a further application.

11. An electronic device which is enabled for communication with a user through a graphical user interface, the electronic device including a computer readable medium having stored thereon software instructions for:
displaying, on the graphical user interface, a content of a file system using a visual representation for each one of a plurality of folders in the file system while suppressing a visual representation of each one of one or more files stored in each one of the plurality of folders in the file system;
receiving, via the graphical user interface, a user command defining selection of a first folder among the plurality of folders;
displaying, upon receipt of the user command defining the selection of the first folder, on the graphical user interface, a content of the first folder using the visual representation for each one of one or more files stored in the first folder while suppressing the visual representation of each one of the folders stored in the first folder; and
receiving, via the graphical user interface, a user command defining the selection of a first file among the one or more files.

12. The electronic device according to claim 11, wherein the software instructions are further configured for: arranging the visual representation of the plurality of folders in accordance with a hierarchical level of the plurality of folders.

13. The electronic device according to claim 11, wherein the software instructions are further configured for: arranging visual of subfolders of a parent folder along a borderline of a visual representation of the parent folder.

14. The electronic device according to claim 11, wherein the software instructions are further configured for: adapting a visual representation of a parent folder to a number of subfolders stored in the parent folder.

15. The electronic device according to claim 11, wherein the software instructions are further configured for: displaying the visual representation of the plurality of folders in substantially rectangular shapes.

16. The electronic device according to claim 11, wherein the software instructions are further configured for: selecting the plurality of folders in accordance with one or more predefined rules.

17. The electronic device according to claim 11, wherein the software instructions are further configured for: receiving, via the graphical user interface, a user command defining an operation for the first file.

18. The electronic device according to claim 11, wherein the software instructions are further configured for: receiving, via the graphical user interface, a user command defining one or more of a zoom level and a focus area, and adapting the displaying of the visual of the plurality of folders to one or more of the zoom level and the focus area.

19. The electronic device according to claim 11, wherein the software instructions are further configured for: displaying, on the graphical user interface, a recent file area for displaying a list of recently selected files.

20. The electronic device according to claim 11, wherein the software instructions are further configured for: displaying, on the graphical user interface, a drop file area for enabling dropping and processing of a file selected from a further application.

* * * * *